US012611662B2

(12) United States Patent
Born et al.

(10) Patent No.: US 12,611,662 B2
(45) Date of Patent: Apr. 28, 2026

(54) NOBLE METAL NET FOR CATALYZING GAS PHASE REACTIONS, PRODUCTION METHOD FOR SAME, AND USE OF SAME IN AN AMMONIA OXIDATION METHOD

(71) Applicant: UMICORE AG & CO. KG, Hanau-Wolfgang (DE)

(72) Inventors: Dirk Born, Langenselbold (DE); Dieter Prasch, Steinau (DE); Martin Votsmeier, Weinheim (DE); Artur Wiser, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 476 days.

(21) Appl. No.: 18/252,417

(22) PCT Filed: Nov. 16, 2021

(86) PCT No.: PCT/EP2021/081806
§ 371 (c)(1),
(2) Date: May 10, 2023

(87) PCT Pub. No.: WO2022/106396
PCT Pub. Date: May 27, 2022

(65) Prior Publication Data
US 2023/0415139 A1 Dec. 28, 2023

(30) Foreign Application Priority Data
Nov. 17, 2020 (EP) ..................................... 20000415

(51) Int. Cl.
| | |
|---|---|
| *B01J 35/06* | (2006.01) |
| *B01J 23/42* | (2006.01) |
| *B01J 23/46* | (2006.01) |
| *B01J 35/58* | (2024.01) |
| *B01J 37/00* | (2006.01) |
| *C01B 21/26* | (2006.01) |

(52) U.S. Cl.
CPC .............. *B01J 35/58* (2024.01); *B01J 23/42* (2013.01); *B01J 23/464* (2013.01); *B01J 37/00* (2013.01); *C01B 21/265* (2013.01)

(58) Field of Classification Search
CPC . B01J 35/58; B01J 23/42; B01J 23/464; B01J 37/00; B01J 21/265
See application file for complete search history.

(56) References Cited

U.S. PATENT DOCUMENTS

| | | | |
|---|---|---|---|
| 4,322,232 A | 3/1982 | Beane | |
| 5,232,891 A | 8/1993 | Hörmann et al. | |

FOREIGN PATENT DOCUMENTS

| | | | |
|---|---|---|---|
| DE | 4028916 C2 | 3/1992 | |
| DE | 4206199 C1 | 11/1992 | |
| EP | 0364153 A1 * | 4/1990 | .............. D04B 1/14 |
| EP | 1 358 010 B2 | 7/2008 | |
| WO | 2014/099592 A1 | 6/2014 | |

OTHER PUBLICATIONS

International Search Report dated Feb. 18, 2022 for International Patent Application No. PCT/EP2021/081806 (3 pages in German with English translation).
Written Opinion of the International Searching Authority dated Feb. 18, 2022 for International Patent Application No. PCT/EP2021/081806 (5 pages in German).
Advanced European Search Report mailed May 11, 2021 for European Patent Application No. 20000415.8 (8 pages in German with English Translation).
Maxwell, G.R. Chapter 9: Nitric Acid. Synthetic Nitrogen Products—A Practical Guide to the Products and Processes. Springer Science + Business Media, Inc. 2005. p. 213-250 (220).
Jess, Andreas et al. Chapter 6.4. Nitric Acid. Chemical Technology; Wiley-VCH Verlag, Weinheim. 2013. pp. 568-583.
Warner, Maximilian. The Kinetics of Industrial Ammonia Combustion. Thesis. The University of Sydney. 2013. 260 Pages.
Translation of the Written Opinion of the International Searching Authority mailed Feb. 18, 2022 for International Patent Application No. PCT/EP2021/081806 (7 Pages).
International Preliminary Report on Patentability mailed May 16, 2023 for International Patent Application No. PCT/EP2021/081806 (7 Pages in German; 8 pages English Translation).

* cited by examiner

*Primary Examiner* — Yong L Chu
(74) *Attorney, Agent, or Firm* — Smith, Gambrell & Russell, LLP

(57) ABSTRACT
The invention relates to a method for producing noble metal nets on flatbed knitting machines, the steps involving—providing noble metal wire comprising platinum—providing yarn that is combustible or soluble in solvent—knitting two-bed items by simultaneous knitting on the front and rear needle beds and joining the two knitted fabrics by means of connecting pile threads, wherein, on the front or on the rear needle bed, a combustible or soluble yarn is used which is burnt off or dissolved after the knitting process, and a noble metal wire is used on the other needle bed and for the pile threads such that, after the combustible or soluble yarn has been burnt off or dissolved, there remain only the pile threads and the knitted fabric made of noble metal wire and produced on the rear or front needle bed.

20 Claims, 5 Drawing Sheets

NOBLE METAL NET FOR CATALYZING GAS PHASE REACTIONS, PRODUCTION METHOD FOR SAME, AND USE OF SAME IN AN AMMONIA OXIDATION METHOD

The invention relates to knitted noble metal nets having a novel knitted structure for the catalytic oxidation of ammonia—in particular for the oxidation to NO, as used for nitric acid production.

Noble-metal-catalyzed gas reactions, such as the oxidation of ammonia with atmospheric oxygen in nitric acid production (Ostwald process) or the reaction of ammonia with methane in the presence of oxygen to yield hydrocyanic acid (Andrussov process) have long been important in industry, since they provide base chemicals for the chemical industry and for fertilizer production on an industrial scale (Andreas Jess, Peter Wasserscheid: Chemical Technology, Wiley-VCH Verlag, Weinheim 2013, Chapter 6.4.)

At the center of these heterogeneously catalyzed gas reactions are noble metal catalysts in the form of gas-permeable spatial structures, on or in which the reaction takes place. Here, nets in the form of woven textiles (DE4028916 C2) or knitted fabrics (EP0364153 B1, DE4206199 C1) made of fine noble metal wires have been established for some time now.

The knitting of metal wire is known; U.S. Pat. No. 4,322,232 discloses a filter bag into which a conductive thread is knitted in order to prevent static charging in filter bags. This conductive thread can be produced, for example, from synthetic thread with metallic fibers added.

WO 2014/099592 A1 discloses the preparation of hydrocyanic acid by means of the Andrussov process, wherein the knitted catalyst net used for this purpose is supported by a corrugated, gas-permeable support which, due to its shape, reduces or even completely prevents breaking of the catalyst net. For this method, a platinum content of 90 wt % is sought, which increases the risk of the net breaking.

The catalyst nets are typically arranged in a flow reactor in a plane perpendicular to the flow direction of the gas mixture. Conical arrangements are also known. Several nets are, expediently, arranged one after the other and combined to form a net stack.

BRIEF DESCRIPTION OF THE DRAWINGS

FIG. 1 schematically shows the reactor with the net stack, whose function is described below, installed therein, in an example of catalytic ammonia oxidation (Ostwald process).

Figure 1:
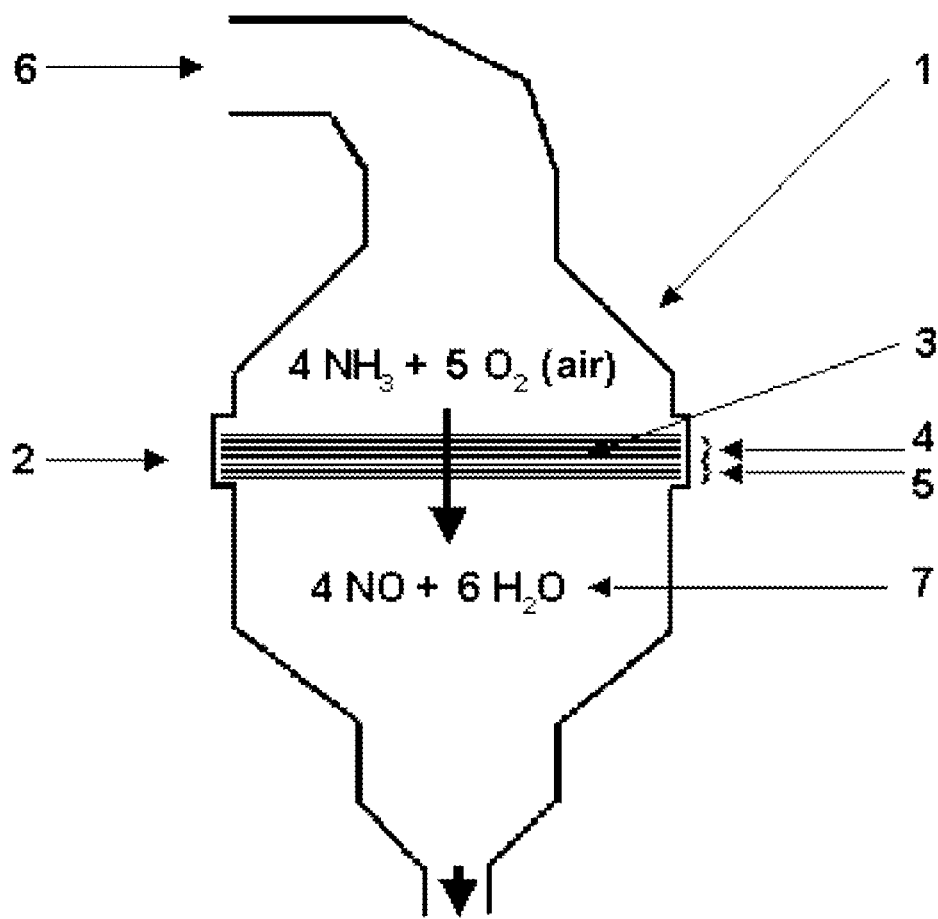
FIG. 1 schematically shows a reactor with net stack.

In the reaction zone (2) of the flow reactor (1), the net stack (3), which consists of several catalyst nets (4) arranged one after the other and of downstream separating and getter nets (5), is arranged in a plane perpendicular to the flow direction. This net stack is held in its position by clamping.

The reaction gas (ammonia-atmospheric oxygen mixture having an ammonia content of 9-13 vol %) (6) flows through the net stack (3) at atmospheric or increased pressure, wherein the gas mixture is ignited in the inlet region, and the combustion reaction yielding nitrogen monoxide (NO) and water (7) encompasses the entire reaction zone (2):

$$4NH_3+5O_2(air)\rightarrow 4NO+6H_2O$$

Adverse side reactions are the oxidation of the ammonia to nitrogen and nitrous oxide ($N_2O$), wherein the former reduces only the yield of NO, but the latter also constitutes a strong greenhouse gas:

$$4NH_3+3O_2(air)\rightarrow 2N_2+6H_2O$$

$$4NH_3+4O_2(air)\rightarrow 2N_2O+6H_2O$$

The NO in the outflowing reaction gas mixture subsequently reacts with excess atmospheric oxygen to yield $NO_2$:

$$2NO+O_2\rightarrow 2NO_2$$

An undesired side reaction here is the formation of nitrous oxide:

$$2NO+\tfrac{1}{2}O_2\rightarrow 2N_2O$$

The $NO_2$ in turn reacts in a downstream absorption with water to yield nitric acid, which is routed, for example, to fertilizer production:

$$3NO_2+H_2O+2HNO_3+NO$$

Noble metal wires made of platinum, rhodium, or of alloys of said metals with other noble or non-noble metals are currently used for the production of the noble metal nets. Platinum-rhodium or platinum-palladium-rhodium alloys having 88 to 97 wt % platinum are typical here. Platinum is required to achieve the highest possible ammonia conversion; rhodium improves the selectivity to NO, thereby reducing the emission of nitrous oxide, and increases the mechanical strength [G. R. Maxwell: "Synthetic Nitrogen Products—A Practical Guide to the Products and Processes," Springer Science+Business Media, Inc., 2005, page 220]. In turn, palladium is used, depending upon noble metal prices, to reduce the noble metal costs by replacing platinum.

Figure 2:
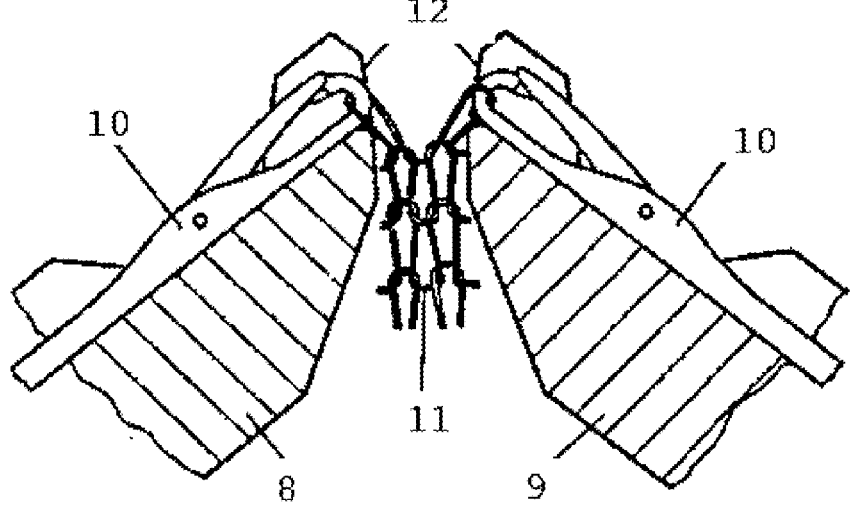
FIG. 2 shows the structure of a flat-bed knitting machine.

Flat-bed knitting machines are used for the knitting of noble metal nets. The structure of the flat-bed knitting machine is illustrated in FIG. 2. The flat-bed knitting machine has a front (8) and a rear needle bed (9) in which the latch needles (10) are installed. The latch needles pass through different positions depending upon the programming of the machine. The programming thus specifies the structure of the knitted fabric. A special feature of the flat-bed knitting machine as compared to other fabric-forming machines is that the knitted fabrics can be formed synchronously and independently of one another on the front as well as on the rear needle beds (single-bed article). Moreover, spacer fabrics (two-bed article) can be formed, in which the thread alternately in the front and rear forms stitches or double-knits (EP1358010 B2). The knitted fabric is knitted downwardly between the two needle beds (11). This is done by successively casting off the individual formed stitches over the casting-off position and casting-off web edge (12).

Knitted noble metal nets have a number of advantages over woven noble metal nets, which is why they are preferred today in industrial use. For one thing, knitting technology offers the potential for a high degree of flexibility with respect to knitting patterns, wire thicknesses used, and resulting basis weight. For another, noble metal knitted fabrics can be produced more economically, since set-up times are shorter in knitting technology than in weaving technology. This requires, in particular, a significantly reduced noble metal bond in production. In addition, noble metal nets of any length can be produced on flat-bed knitting machines.

The principle terms are defined below:

Gold, silver, and the platinum metals (Ru, Rh, Pd, Os, Ir, Pt) are to be considered noble metals.

The nets, the catalytic activity of which is used for the reaction of ammonia with oxygen, are referred to as catalyst nets.

Getter nets refer to the nets which are installed in the reaction gas flow on the outlet side with respect to the catalyst nets in order to capture volatile platinum oxide for the purpose of recycling by alloying with the palladium of the getter nets and thus to minimize the loss of platinum.

The entirety of the catalyst and getter nets are referred to as noble metal nets.

Nets made from high-temperature-stable steel, which are installed between the getter nets and/or between the catalyst net stack and the adjacent first getter net in order to prevent the noble metal nets in question from being sintered together, are referred to as separating nets.

The net stack consists of the catalyst nets on the inlet side of the net stack, and optionally of the getter nets on the outlet side of the net stack, as well as the separating nets, which are optionally installed between the noble metal nets.

The reactor, which ensures that the reaction gas is passed over the net stack installed therein, is referred to as the flow reactor.

The knitting process is carried out using the latch needles. A latch needle is required for each wale of a knitted fabric.

Needle bed, single-bed article, two-bed article, pile thread: The needle bed is the element of the flat-bed knitting machine over which the tongue needles are guided. The flat-bed knitting machine usually has a front and a rear needle bed, on each of which one knitted fabric can be knitted (single-bed article). If, during the knitting process, these two knitted fabrics are knitted together using pile threads, the newly-formed knitted fabric is a two-bed article.

A looping is formed by the joining of two loops. Double-knit is a looping which, in an R/R bond, is inserted from one needle bed to the opposite needle bed. The terms, "doubleknit," "loop," and "R/R bond," are known to the person skilled in the art.

Stitch row and wale: The stitches formed successively by the same thread are referred to in their entirety as a row of stitches. The rows of stitches running in parallel are held together by interlooping the stitches of a wale.

Fabric plane is to refer to the plane which is formed from the rows of stitches and wales of the knitted fabric formed on the front or rear needle bed.

Figure 3:
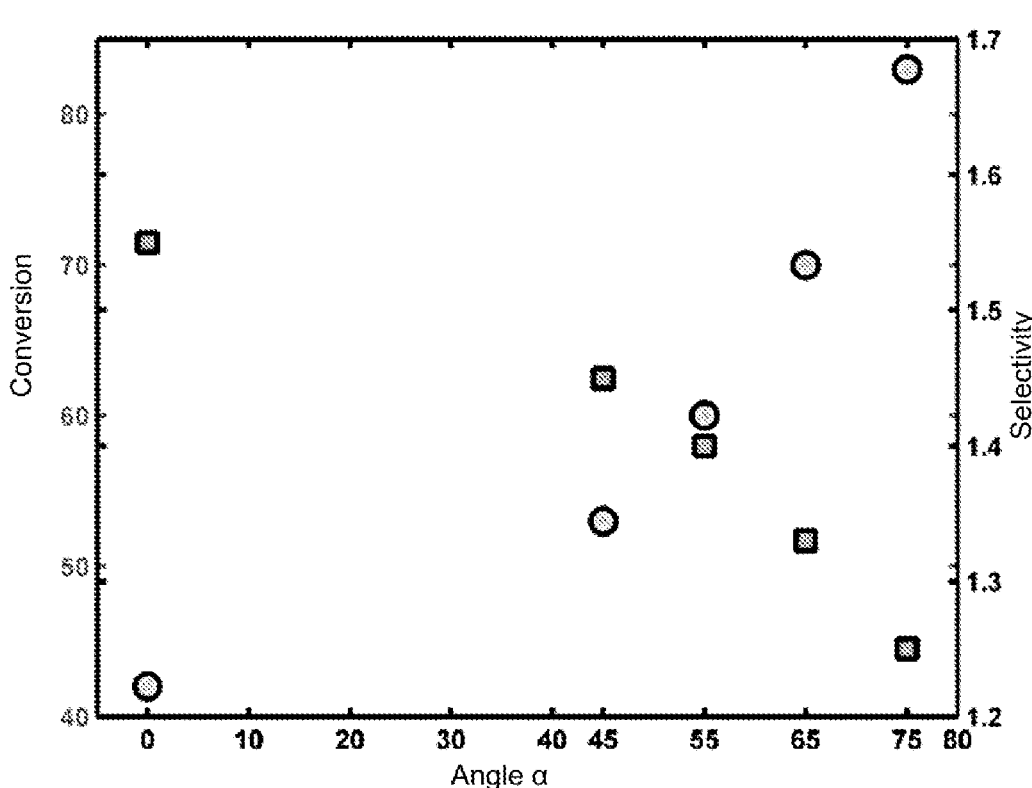
FIG. 3 shows a computer simulation of ammonia oxidation over a noble metal wire of a different orientation with constant width of the region through which flow passes.
Figure 4:
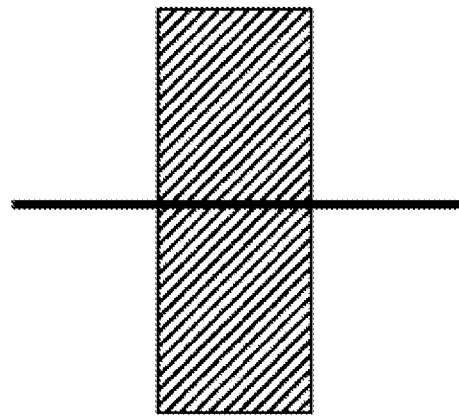
FIG. 4 shows an angle α of 0° wherein a wire within the plane is perpendicular to the flow direction of the reaction gas.
Figure 5:
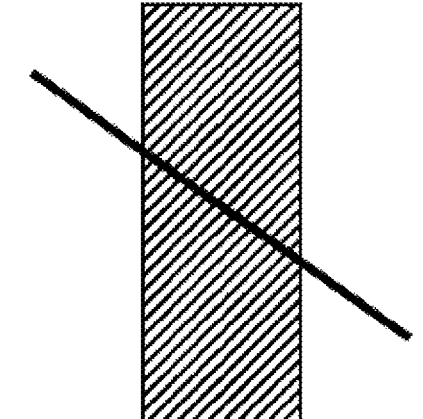
FIG. 5 shows a wire which is tilted at an angle α=35° in the reaction zone.

Usually, the catalyst nets (3) are installed in the flow reactor (1) perpendicular to the flow direction of the reaction gas mixture. The inventors have found that the inflow angle at which the reaction gas mixture impinges on the noble metal wire influences the selectivity to $N_2O$. Computer simulation calculations confirmed this. FIG. 3 shows the computer simulation of the ammonia oxidation over a noble metal wire (assumed composition PtRh5) of a different orientation with constant width of the region through which flow passes. In this case, the deviation from the perpendicular flow over the wire is shown as angle $\alpha$ on the x-axis. An angle $\alpha$ of 0° thus corresponds to a wire within the plane perpendicular to the flow direction of the reaction gas (FIG. 4) corresponding to the orientation of the catalyst nets (3) in the flow reactor (1). FIG. 5 shows a wire which is tilted at an angle $\alpha=35°$ in the reaction zone. The ammonia conversion (symbol: circles) is on the left y-axis, and the selectivity to $N_2O$ (symbol: squares) is on the right y-axis. It is evident that, as the angle $\alpha$ increases, the ammonia conversion increases, and the selectivity to $N_2O$ decreases. The more obliquely that flow is passed over the wire, the higher the conversion of ammonia and the lower the selectivity for the oxidation of ammonia to $N_2O$. The increasing ammonia conversion can be accounted for by the longer wire length and thus greater surface area within the area through which the flow passes. The lower selectivity for the oxidation of ammonia to $N_2O$ is, however, surprising.

The object of the present invention was therefore to develop a method with which a noble metal net can be produced which, due to its structure, has a higher selectivity for the oxidation of ammonia to NO.

The object was achieved by a method for producing noble metal nets on flat-bed knitting machines, the steps involving providing noble metal wire, comprising platinum
providing yarn that is combustible or soluble in solvent
knitting two-bed articles by simultaneous knitting on the front (8) and rear (9) needle beds and joining the two knitted fabrics by connecting pile threads, wherein the two knitted fabrics are combined by connecting pile threads, and, on the front (8) or on the rear (9) needle bed, a combustible or soluble yarn is used which is burnt off or dissolved after the knitting process, and a noble metal wire is used on the other needle bed and for the pile threads such that, after the combustible or soluble yarn has been burnt off or dissolved, there remains only the pile thread or the pile threads and the knitted fabric made of noble metal wire and produced on the rear (9) or front (8) needle bed.

By removing the knitted fabric produced on the rear or front needle bed, a noble metal net having loops protruding from the net plane is produced. As already described, as a result of the noble metal wire portion in the loops, the selectivity for the oxidation of ammonia to $N_2O$ is reduced.

Figure 6:
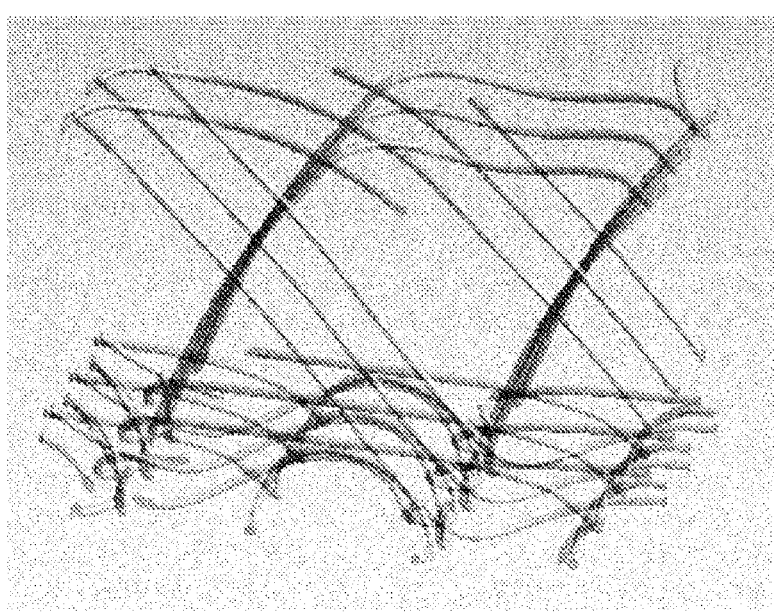
FIG. 6 shows a noble metal net according to the invention.
Figure 7:
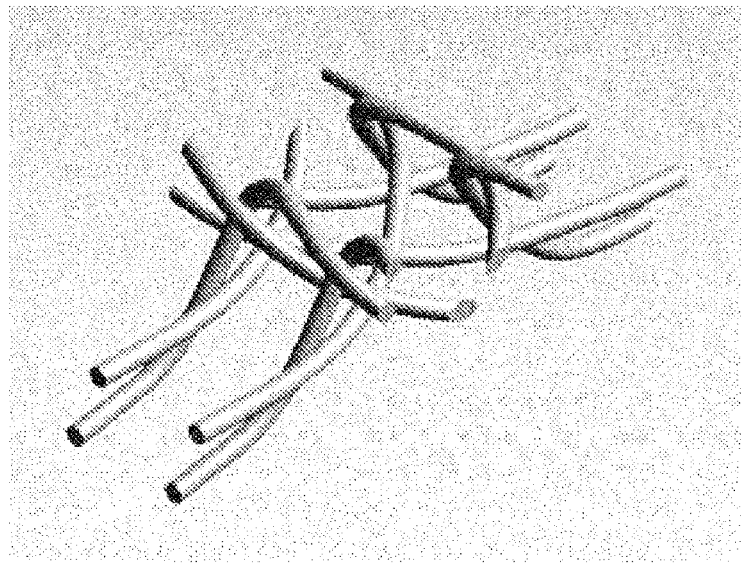
FIG. 7 shows a noble metal net as a single-bed article according to the prior art.

Due to the feature of the protruding loops, even after production is completed, the noble metal net according to the invention is distinguishable from a noble metal net according to the prior art. FIG. 6 shows a noble metal net according to the invention, and FIG. 7 a noble metal net as a single-bed article according to the prior art. The protruding loops of the noble metal net according to the invention can clearly be seen, while they are missing in the noble metal net as a single-bed article according to the prior art.

Figure 8:
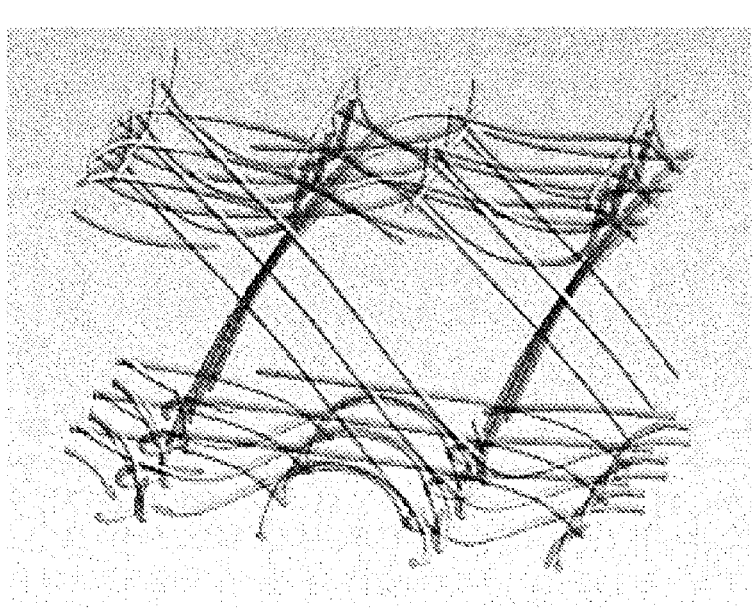
FIG. 8 shows a noble metal net as a two-bed article according to the prior art.

FIG. 8 shows a noble metal net as a two-bed article according to the prior art. Since, in this case, both the knitted fabric produced on the front needle bed and that produced on the rear needle bed are present, no protruding loops are discernible here as well. Thus, the noble metal net according to the invention also differs significantly from said noble metal net of the prior art. Here too, the proportion of noble metal wire, which does not extend within the noble metal net plane, is significantly greater in the noble metal net according to the invention than in the case of the two-bed article according to the prior art.

When a soluble yarn is used, said yarn is preferably soluble in water. As solvent, water is preferred over organic solvents for both environmental protection and occupational health and safety reasons.

The noble metal wire preferably consists of an alloy comprising platinum and rhodium. Due to the platinum, good catalytic activity for the ammonia conversion is achieved; rhodium improves the selectivity to NO and thus reduces the nitrous oxide emissions.

The pile thread or the pile threads and the knitted fabric made of noble metal wire and produced on the rear (9) or front (8) needle bed preferably consist of noble metal wire of the same composition and the same diameter. This reduces the complexity of the production.

In one particular embodiment, for the pile thread or the pile threads, a noble metal wire having a larger diameter is used than for the knitted fabric produced on the rear (9) or front (8) needle bed. As a result, the nitrous oxide formation can additionally be reduced without excessively increasing the noble metal content, since thicker noble metal wires increase selectivity to NO ("The Kinetics of Industrial Ammonia Combustion," Maximilian Warner, Ph.D. thesis, Univ. of Sydney, 2013).

The invention also comprises a noble metal net produced by the method according to the invention.

The invention also comprises a knitted noble metal net having loops protruding from the net plane, which loops are formed by the pile thread or the pile threads and project at least 1 mm and at most 5 mm above the surface of the stitches of the knitted fabric and protrude at an angle of 45° to 90° to the plane of the knitted fabric. The loops preferably project 1 to 3 mm above the surface of the stitches of the knitted fabric.

Preferably, the noble metal wire or the noble metal wires consist of a platinum alloy having more than 75 wt % platinum.

Furthermore, a method for the catalytic oxidation of ammonia is part of the invention and comprises the following steps:

Providing one or more noble metal nets according to the invention

Combining the noble metal nets to form a net stack (3)

Installing the net stack (3) in a flow reactor (1)

Supplying a gas (6) containing ammonia and oxygen at a temperature in the flow reactor (1) between 500° C. and 1,300° C. and a pressure between 0.1 MPa and 1.4 MPa, wherein the ammonia reacts catalytically with the oxygen and NO is obtained (7), which can be used for the preparation of nitric acid.

In a preferred embodiment variant, in the second step, getter nets and separating nets (5) are also incorporated into the net stack (6).

Preferably, the nets are installed in such a way that the loops protruding from the net plane, which are formed by the pile thread or the pile threads, face the gas flow, so that the reaction gas impinges first of all on the pile threads. The reaction gas can thus already react on the surface of the pile threads before it impinges on the surface of the knitted fabric produced on the rear (9) or front (8) needle bed, which knitted fabric has a higher selectivity for the oxidation of ammonia to $N_2O$ than do the loops.

The invention claimed is:

1. A method for producing noble metal nets on flat-bed knitting machines, involving the steps of
  a. providing noble metal wire comprising platinum
  b. providing yarn that is combustible or soluble in solvent c. knitting two-bed articles by simultaneous knitting on the front (8) and rear (9) needle beds,
characterized in that the two knitted fabrics are joined by connecting pile threads, and, on the front (8) or on the rear (9) needle bed, the provided combustible or soluble yarn is used which is burnt off or dissolved after the knitting process, and the provided noble metal wire is used on the other needle bed and for the pile threads such that, after the combustible or soluble yarn has been burnt off or dissolved, there remains only the pile thread or the pile threads and the knitted fabric made of noble metal wire and produced on the rear (9) or front (8) needle bed, so that the knitted fabric has loops protruding from the net plane and formed from the pile thread or the pile threads.

2. The method according to claim 1, characterized in that the yarn that is soluble in solvent is a water-soluble yarn.

3. The method according to claim 1, characterized in that the noble metal wire consists of an alloy comprising platinum and rhodium.

4. The method according to claim 1, characterized in that the pile thread or the pile threads and the knitted fabric produced on the rear (9) or front (8) needle bed consist of noble metal wire of the same composition and the same diameter.

5. The method according to claim 1, characterized in that the pile thread or the pile threads has or have a greater wire diameter than the noble metal wire or the noble metal wires of the knitted fabric produced on the rear (9) or front (8) needle bed.

6. A noble metal net, characterized in that it is produced by a method according to claim 1.

7. A noble metal net knitted from noble metal wires, characterized in that the knitted fabric has loops protruding from the net plane, which loops are formed by the pile thread or the pile threads and project at least 1 mm above the surface of the stitches of the knitted fabric and protrude at an angle of 45° to 90° to the knitted plane.

8. The noble metal net according to claim 6, wherein the noble metal wire or the noble metal wires of the noble metal net consist of a platinum alloy having at least 75% platinum.

9. A method for the catalytic oxidation of ammonia, involving the steps of
  a. providing noble metal nets according to claim 6
  b. combining the noble metal nets (4) to form a net stack (3)
  c. installing the net stack (3) in a flow reactor (1)
  d. supplying a gas (6) containing ammonia and oxygen at a temperature in the flow reactor (1) between 500° C. and 1,300° C. and a pressure between 0.1 MPa and 1.4 MPa.

10. The method according to claim 9, characterized in that, in step b, getter nets and separating nets (5) are used for the net stack (6).

11. The method according to claim 9, characterized in that the noble metal net or the noble metal nets are installed in such a way that the loops protruding from the net plane, which are formed by the pile thread or the pile threads, face the gas flow of the reaction gas.

12. The method according to claim 1, wherein the provided yarn includes yarn that is combustible and is burnt off after the knitting process.

13. The method according to claim 1, wherein the provided yarn includes yarn that is soluble in solvent and is dissolved after the knitting process.

14. A method for producing noble metal nets on flat-bed knitting machines, involving the steps of

7 a. providing noble metal wire comprising platinum b. providing yarn that is combustible or is soluble in water c. knitting two-bed articles by simultaneous knitting on the front (8) and rear (9) needle beds, characterized in that the two knitted fabrics are joined by connecting pile threads, and, on the front (8) or on the rear (9) needle bed, the provided combustible or soluble yarn is used which is burnt off or dissolved after the knitting process, and the noble metal wire is used on the other needle bed and for the pile threads such that, after the combustible or soluble yarn has been burnt off or dissolved, there remains only the pile thread or the pile threads and the knitted fabric made of noble metal wire and produced on the rear (9) or front (8) needle bed, so that the knitted fabric has loops protruding from the net plane and formed from the pile thread or the pile threads.

15. The method according to claim 14, wherein the provided yarn comprises yarn that is combustible and is burnt off after the knitting process.

16. The method according to claim 14, wherein the provided yarn comprises yarn that is soluble in water and is dissolved after the knitting process.

17. The method according to claim 14, wherein the noble metal wire consists of an alloy comprising platinum and rhodium.

18. The method according to claim 14, wherein the pile thread or the pile threads and the knitted fabric produced on the rear (9) or front (8) needle bed consist of noble metal wire of the same composition and the same diameter.

19. The method according to claim 14, wherein the pile thread or the pile threads has or have a greater wire diameter than the noble metal wire or the noble metal wires of the knitted fabric produced on the rear (9) or front (8) needle bed.

20. The method according to claim 14, wherein the knitted fabric has loops protruding from the net plane, which loops are formed by the pile thread or the pile threads and project at least 1 mm above the surface of the stitches of the knitted fabric and protrude at an angle of 45° to 90° to the knitted plane.

* * * * *